FIRE ALARM SYSTEM

Filed Nov. 9, 1946 4 Sheets-Sheet 1

INVENTORS
FREDERICK H. BRAY
ERNEST F. BATES
JOHN C. DOUGHTY
BY Edward [signature]
ATTORNEY INVENTORS
FREDERICK H. BRAY
ERNEST F. BATES
JOHN C. DOUGHTY
BY Edward H. Hinney
ATTORNEY INVENTORS
FREDERICK H. BRAY
ERNEST F. BATES
JOHN C. DOUGHTY
BY
Edward D. Hussey
ATTORNEY Nov. 28, 1950 F. H. BRAY ET AL 2,531,391

FIRE ALARM SYSTEM

Filed Nov. 9, 1946 4 Sheets-Sheet 4

INVENTORS
FREDERICK H. BRAY
ERNEST F. BATES
JOHN C. DOUGHTY
BY Edward D. Phinney
ATTORNEY Patented Nov. 28, 1950

2,531,391

UNITED STATES PATENT OFFICE 2,531,391

FIRE ALARM SYSTEM

Frederick Harry Bray, Ernest Frederick Bates, and John Connell Doughty, London, England, assignors to International Standard Electric Corporation, New York, N. Y.

Application November 9, 1946, Serial No. 709,026
In Great Britain October 19, 1945

Section 1, Public Law 690, August 8, 1946
Patent expires October 19, 1965

2 Claims. (Cl. 177—361)

Figure 1A:
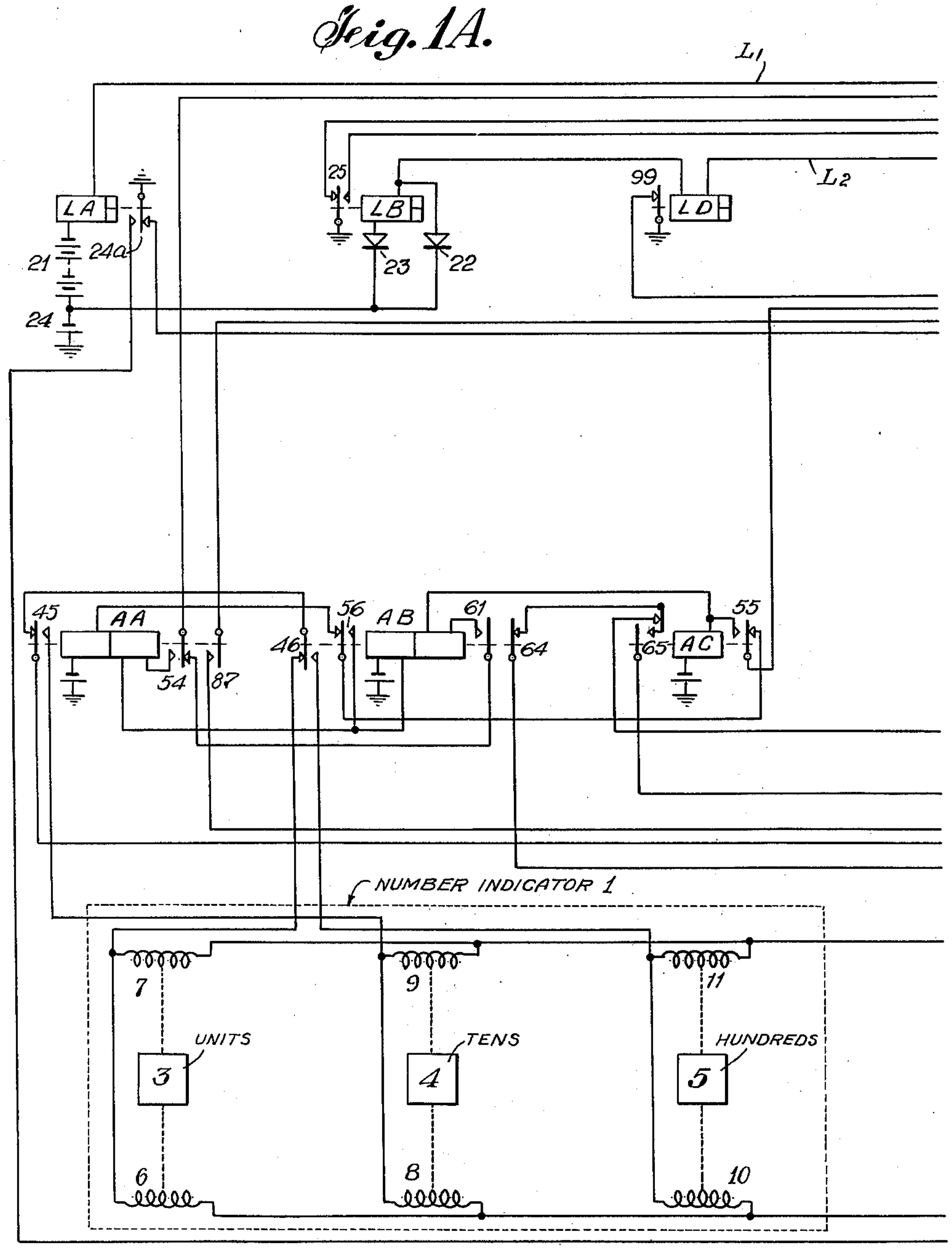

This invention relates to electric signalling systems of the kind in which a plurality of signalling stations is arranged in a closed loop from a central station.

Such systems are commonly used for fire alarm systems and the like. The signals are commonly recorded at the central station upon a paper tape, usually in the form of perforations therein.

There is no difficulty in carrying out such an arrangement if it can be ensured that only one station will send in signals at any one time since the signals, in the form of impulses, could readily be made to move a step-by-step switch to a position in which the resulting setting of the switch is displayed by exposing characters to view. Difficulty arises when it is desired to display in this manner the code signals sent concurrently from more than one signalling station. In the case in which arrangements are provided in known manner at each signalling station to cause the transmission of signals, if initiated whilst signalling from another box is in progress, to be held up until the line is clear, it will be apparent to those skilled in the art that again, little or no difficulty would arise. But if it be desired that there should be the simplest possible equipment at each signalling station then there is difficulty in arranging that, if two stations send signals concurrently, both sets of signals shall be properly displayed.

With the usual paper-tape recording, the presentation of two separate records of the signals sent from two concurrently signalling stations may be achieved in known manner by providing at the central station a relay connected in each leg of the loop, a battery in the loop, a second battery in series aiding to the first battery with one pole connected to one leg of the loop and the other pole earthed. By providing at each signalling station two sets of signalling contacts and arrangements whereby on signalling an earth was connected at the sub-station in such manner that the two sets of signalling contacts sent signals on two different portions of the loop the two relays at the central station would separately receive the signalling impulses and if a second station then commenced signalling, signals from the two stations were received on the different relays in the central station. The records on the paper tape could then be read, by ignoring the first part of one record which was irrelevant to the signals received from the second signalling station. This arrangement cannot, however, be immediately applied to the setting of switches stepped by the impulses since the stepping of a switch by one set of signals would interfere with its correct setting by another, subsequently commenced set of signals.

One feature of the invention comprises a closed-loop electric signalling system such as a fire alarm system comprising a main station and a number of substations on a loop which are adapted to signal their identities to the main station, characterized by numerical or alphabetical indicators at the main station arranged to display a plurality of substation codes simultaneously.

A second feature of the invention comprises a closed-loop electric signalling system such as a fire alarm system comprising a main station and a number of substations on a loop which are adapted to signal their identities to the main station, characterized by numerical or alphabetical indicators at the main station arranged to receive without interference and display a plurality of codes, the transmission of which overlap in time.

A third feature of the invention comprises a fire alarm signalling system characterized by numerical or alphabetical indicators at the fire station arranged to be receiving and/or displaying a plurality of substation codes at the same time.

A fourth feature of the invention comprises a closed loop electric signalling system such as a fire alarm system comprising a main station and a number of substations on a loop which are adapted to signal their identities to the main station, characterized by a pair of numerical or alphabetical indicators at the main station arranged to receive an identity code from the same calling station, and by circuit arrangements at the main station responsive to a signal from a second station before an earlier code transmission is complete to free one of said indicators in readiness to receive and display the identity of the second station.

It is the principal object of the present invention to provide an arrangement in which the code signal sent by a signalling station such as a fire alarm box is displayed at the central station in numerical or alphabetical characters.

A further object of the invention is to provide arrangements by means of which signals from two stations sending concurrently may be correctly received and displayed on number indicators.

Figure 2:
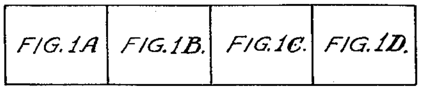
Figure 1B:
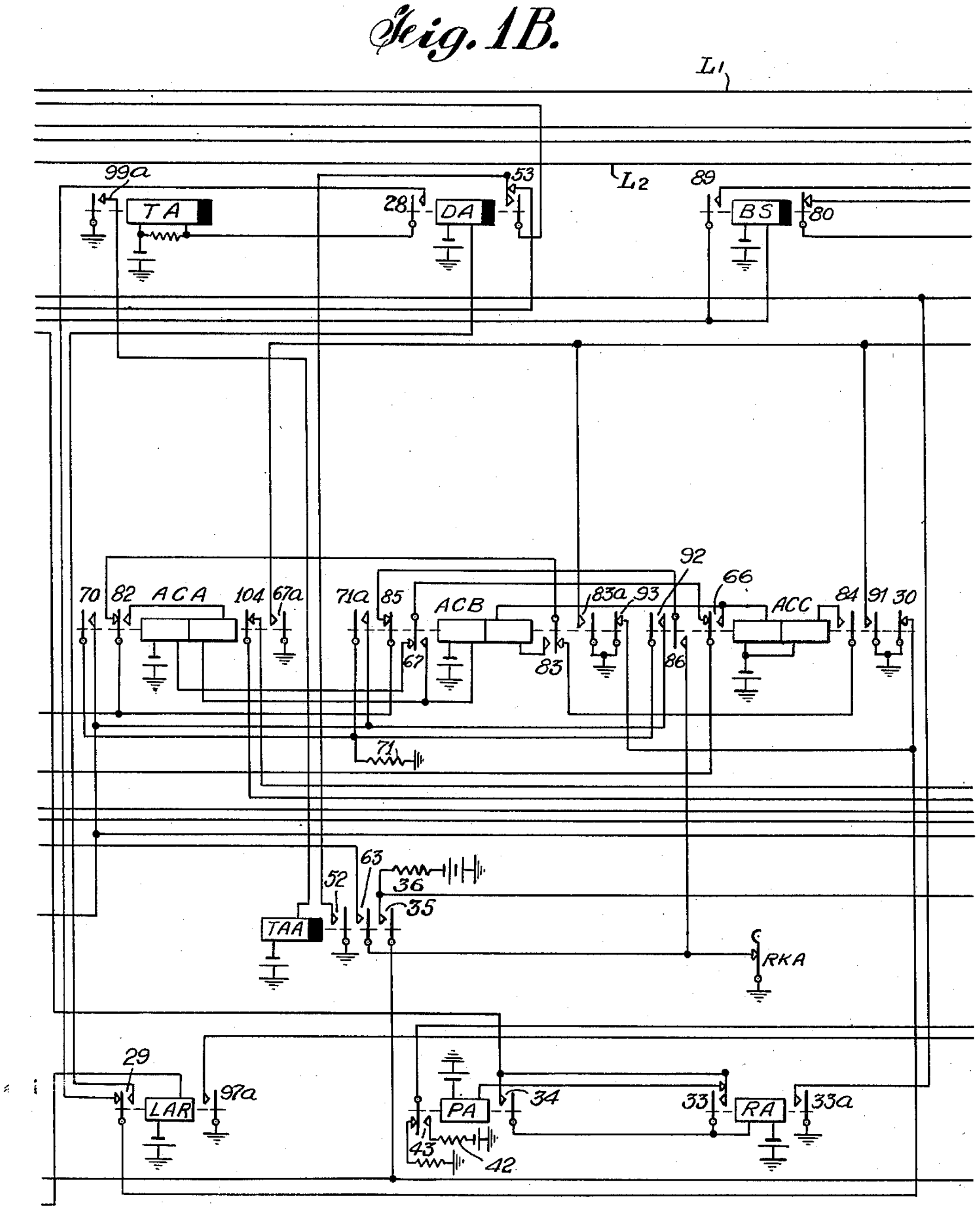
Figure 1C:
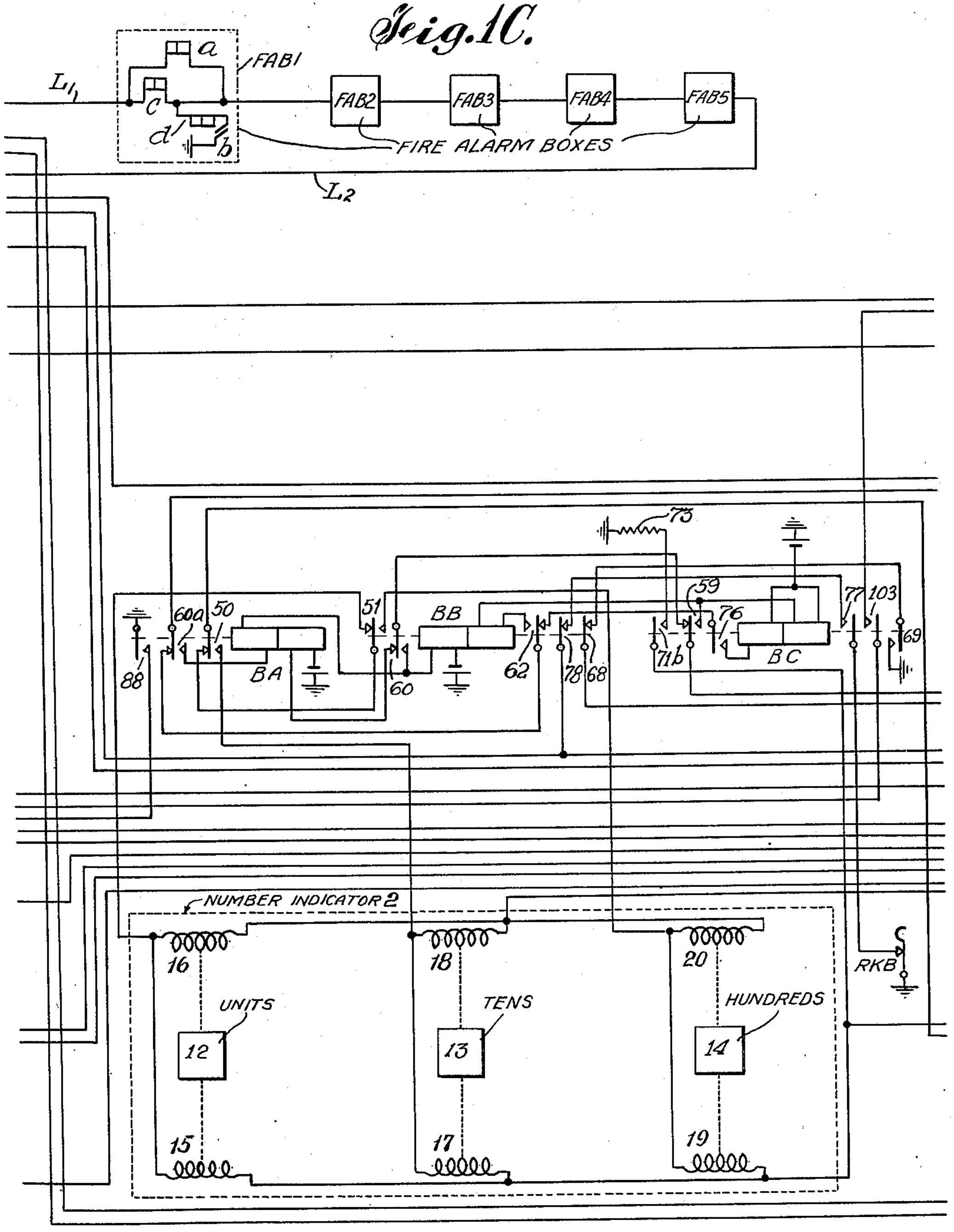
Figure 1D:
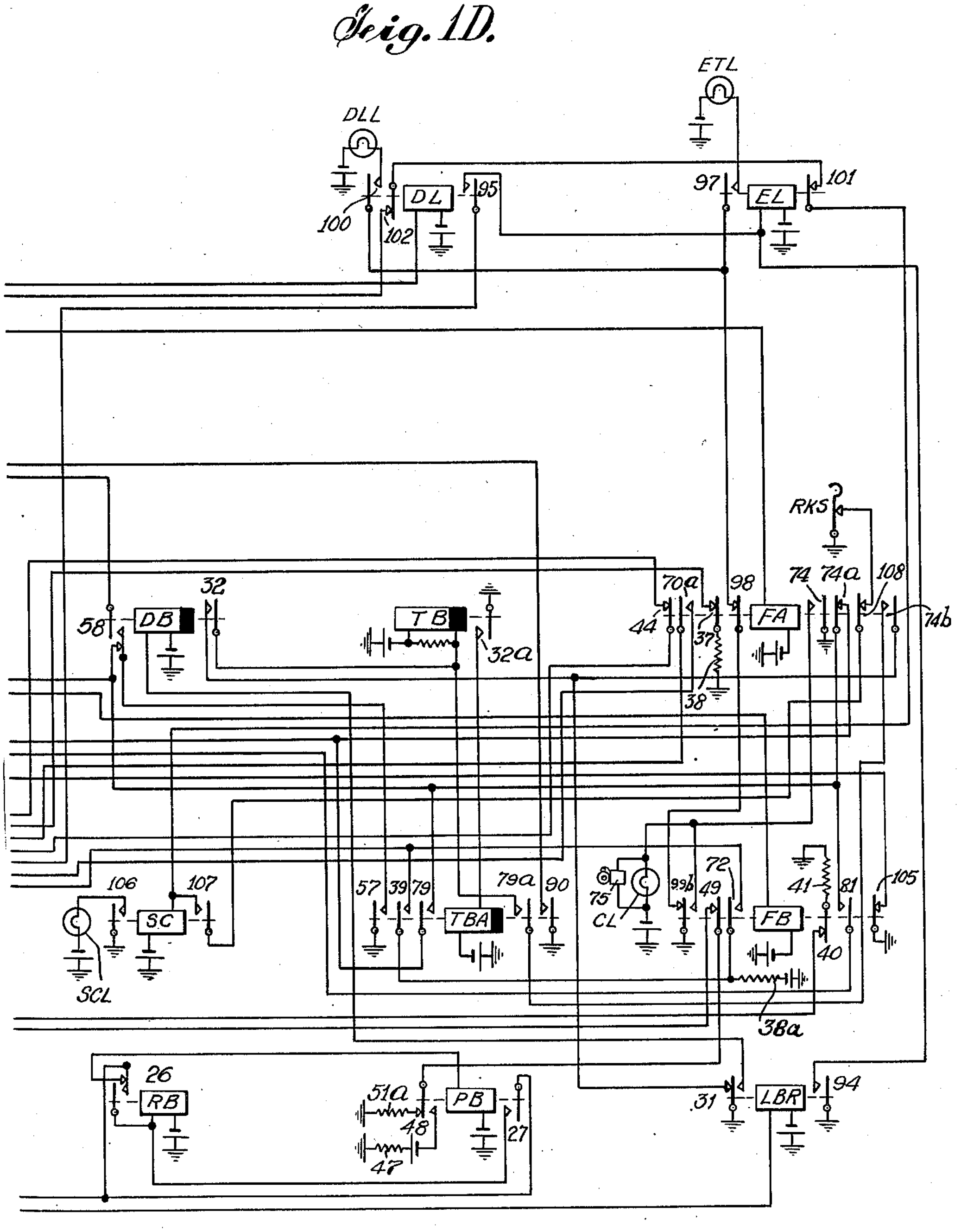

Other objects and advantages of the invention will become apparent from a consideration of the following specification together with the drawings in which Figs. 1A to 1D show in schematic manner a complete system in accordance with my invention when assembled as indicated in Fig. 2 which shows an arrangement of the various figures of the drawing in proper order to illustrate the entire system.

In accordance with the invention, it is proposed to connect the loop at the central station in a manner similar to that described in British Patent No. 557,077 so that the batteries at the central station are common to a plurality of loops. By this means the loops may be arranged so that the probability of there being more than two concurrently signalling stations on any one loop is minimized. The type of number indicators used may be of the kind described in British Patent No. 538,723.

Referring now to Figs. 1A to 1D of the drawing, the embodiment described comprises a plurality of fire alarm boxes FAB1 . . . FAB5 connected to a single-wire signalling loop L1, L2.

The alarm boxes FAB1 . . . 5 are similar to those described in British Patent 557,077, and for the purpose of rendering clearly understandable the operation thereof, the essential elements of an alarm box is diagrammatically illustrated in Fig. 1 in connection with FAB1. To pull a box and thus send an alarm, a handle (not shown) associated with the box opens normally closed contacts *a* and closes normally open contacts *b*. It will be observed that contacts *c* and *d* are normally closed. A code wheel (not shown) is actuated by the handle and is utilized to furnish the various code signals identifying that particular alarm box. Contacts *c* and *d* are actuated by a series of notches in said code wheel, as is well known in the art. A more detailed description of such a code wheel may be found, for instance, in the U. S. Patent 1,920,153, issued to A. A. Clokey on July 25, 1933. It will be understood that alarm boxes FAB2 . . . FAB5 contain apparatus similar to that described above in connection with alarm box FAB1.

Thus signalling may take place by the release of normally operated relay LA or the operation of normally unoperated relay LB, under conditions which will be described in further detail below.

The circuit equipment is in two similar parts allocated to the two legs L1, L2 of the signalling loop and to the number indicators 1 and 2, respectively. Each part comprises digit sequence relays AA, AB, AC and BA, BB, BC, and relays TA, TAA, and TB, TBA responsive to a pre-digital impulse from an alarm box in certain circumstances, as will be explained later. Code repeat relays ACA, BCA serving for both parts of the equipment are also provided.

All apparatus, other than the alarm boxes, is of course, located at the fire station.

Each alarm box is capable of applying a particular code signal to the loop when actuated, as is well known.

The fire station includes number indicators 1 and 2; indicator number 1 comprising three-digit indicators 3, 4 and 5 for indicating units, tens and hundreds respectively, and number indicator 2 comprising similar digit indicators 12, 13 and 14; each digit indicator having pairs of energizing windings, 6 and 7, 8 and 9, 10 and 11, in the case of number indicator 1, and corresponding pairs of windings for the digit indicators 12, 13 and 14 of the number indicator 2, said last-named pairs of windings being designated 15 and 16, 17 and 18, 19 and 20. Number indicator 1 registers the signals sent over the loop of which LA is part and number indicator 2 registers the signals sent over the loop of which LB is a part. The several pairs of windings are connected in series between battery and ground with their mid-points connected in turn to battery and ground at the beginning and end of each digital impulse received thereby effectually short-circuiting each coil in turn to give the indicator associated with each pair of windings two steps for each impulse, as is more particularly described in British Patent No. 538,723.

Relay LA is normally operated from the current delivered by the battery 21 over the closed loop which extends over L1, the several alarm boxes, L2, relay LD, rectifier 22, to battery 21.

Relay LB which is also serially connected in the loop cannot operate since it is blocked by rectifier 23 which, it will be observed, is poled in a manner to prevent a current flow therethrough from battery 21. However, when any alarm box is pulled, earth is applied to the loop L1, L2, and relay LB operates over ground, battery 24, rectifier 23, winding of LB, winding of LD, L2, and all alarm boxes in series to the one that was pulled, to ground.

Contacts 24A of relay LA have already operated relay LAR, since relay LA is normally operated. Contacts 25 of relay LB now operate LBR. Relay RB which has remained locked via its contact 26, contact 25 from a previous operation, is now released. Relay RB is operated under no signal conditions as follows: Relay PB operates initially over contacts 25 back of relay LB, back contact 26 of relay RB and operates RB over contact 27 of relay PB. RB at contact 26 locks itself via contact 25 and releases relay PB.

The digital code used comprises three digits sent by break impulses in both legs of the loop between the ground at the pulled alarm box and the fire station. The initial connection of ground is of a duration sufficient for releasing an indicator at the fire station as will be described below, but this feature has no effect where a signal is sent from a single alarm box without the simultaneous sending of a second signal from a second box.

Relay DA operates via battery, winding DA, front contact 29 of relay LAR, back contact 30 of relay ACC, ground.

The first pulse caused by the break in the closed loop upon the pulling of an alarm box causes the release of both LA and LB relays, which in turn, release the relays LAR and LBR. Relay TA operates via front contact 28 of relay DA, back contact 29 of relay LAR, contact 30 of relay ACC, ground followed by operation of relay TAA. Relay DB operates via: battery, winding of DB, front contact 31 of relay LBR, ground. Relay TB operates via: battery, winding of TB, front contact 32 of relay DB, back contact 31 of relay LBR, ground. Relay TBA operates via: battery, winding to TBA, contact 32*a* of relay TB, ground. Relay PA is operated via battery, winding PA, back contact 33 of relay RA, back contact 24 of relay LA, ground. Relay RA is energized in turn via: battery, winding of RA, contact 34 of relay PA, back contact 24*a* of relay LA. Relay RB over back contact 26 releases PB and then locks via make contact 26, back contact 25 of relay LB, ground. Relay RA similarly over back contact 33 releases relay PA and then locks via: make contact 33, back contact 24*a* of relay LA, ground.

At the end of the break impulse, relays RA and RB are released by the re-operation of relays LA and LB respectively through the removal of ground via contacts 24a and 25 of said respective relays.

Contacts 35 of relay TAA completes a circuit for indicator coil windings 6, 7, 8, 9, 10 and 11 through resistance 36, battery, ground.

A circuit is completed for indicator coils 6, 7, 8, 9, 10 and 11 via: ground, battery, resistance 35, contact 36 of relay TAA, the several pairs of coil windings last mentioned, contact 37 of relay FA, resistance 38, ground. A similar circuit is completed for indicator coils 15 through 19 via: ground, battery, resistance 38a, contact 39 of relay TBA, the several pairs of coil windings last mentioned, contact 40 of relay FB, resistance 41, ground. However, coil 6 is connected via: ground, resistance 42, back contact 43 of relay PA, back contact 44 of relay FA, back contact 45 of relay AA, back contact 46 of relay AB, the junction between coils 6 and 7, contact 35 of relay TAA, resistance 36, battery, ground, but operation of contacts 43 effectively short-circuits coil 6 since both ends of said coil are then connected to battery and therefore coil 7 is energized over the following circuit: ground, battery, resistance 42, front contact 43 of relay PA, back contact 44 of relay FA, back contact 45 of relay AA, back contact 46 of relay AB, winding of coil 7, contact 37 of relay FA, resistance 38, ground. Upon the release of relay PA, the armature of contact 43 moves to the back contact and coil 6 becomes energized over an obvious circuit. The unit indicator 3 has now taken one step and each break impulse of the first digit similarly steps unit indicator 3.

The short-circuiting of coil 15 of number indicator 2 upon release of the PB relay is identical with that described in connection with coil 6 of number indicator 1, except that the coil 15 is connected via: ground, resistance 47, front contact 48 of relay PB, back contact 49 of relay FB, back contact 50 of relay BA, back contact 51 of relay BB, the junction between coils 15 and 16, contact 39 of relay TBA, resistance 47, battery, ground, but operation of contact 48 to its back position upon release of relay PB completes the circuit for the energization of coil 16 over the following circuit: ground, battery, resistance 51a, back contact 48, back contact 49 of relay FB, back contact 50 of relay BA, back contact 51 of relay BB, junction of coils 15 and 16, winding of coil 16, contact 39 of relay TBA, resistance 38a, battery, ground. The unit indicator 12 has now taken one step and each break impulse of the first digit similarly steps unit indicator 3.

At the end of the first digit there is a long break impulse giving an interdigital pause. Slow release relay DA which holds during digital break impulses is now released since relay LAR has released so that relay AA energizes via: ground, contact 52 of relay TAA, back contact 53 of relay DA, back contact 54 of relay AA, back contact 55 of relay AC, back contact 56 of relay AB, left-hand winding of relay AA, battery, ground. A similar interdigital pause may be obtained at the end of the first digit in the circuit associated with the loop represented by the LB relay. Slow release relay DB which holds during digital break impulses is now released since relay LBR has released, so that relay BA energizes via: ground, contact 57 of relay TBA, back contact 58 of relay DB, back contact 59 of relay BC, back contact 60 of relay BB, right-hand winding of relay BA, battery, ground.

The impulse-repeating circuit represented by relays LA, LAR, etc., are now disconnected from the units indicator 3 by the operation of contact 45 of relay AA. When relay AA energized, contact 45 moved from its back to its front position and the connection thru contact 46 of relay AB and thence to the junction of coils 6 and 7 of the units indicator 3 of the number indicator 1 was broken and connection was made to the junction between coils 8 and 9 of the tens indicator 4 over the front contact 45 of relay AA.

In the case of the number indicator 2, the impulse-repeating circuit represented by relays LB, LBR, etc., are likewise disconnected from the units indicator 12 by the operation of contact 50 of relay BA. When relay BA energized, contact 50 moved from its back to its front position and the connection through back contact 51 of relay BB and thence to the junction of coils 15 and 16 of the units indicator 12 of the number indicator 2 was broken and connection was made to the junction between coils 17 and 18 of the tens indicator 13 over the front contact 50 of relay BA.

At the end of the interdigital pause, relay AA locks in series with relay AB via: ground, contact 52 of relay TAA, front contact 53 of relay DA, front contact 54 of relay AA, right-hand winding of relay AA, left-hand winding of relay AB, battery, ground. Similarly relay BA locks in series with relay BB via: ground, battery, left-hand winding of relay BB, left-hand winding of relay BA, front contact 60a of relay BA, front contact 58 of relay DB, contact 57 of relay TBA, ground.

The next digit is now repeated to the tens indicators 4 and 13 of number indicators 1 and 2 respectively, after which the interdigital pause again releases DA in the case of that portion of the loop represented by the LA, LAR, etc., relays and DB in the case of that portion of the loop represented by the LB, LBR, etc., relays. The circuit for AA and BA is opened at front contact 53 of relay DA and a new holding circuit is made for relays AA and AB via: ground, contact 52 of relay TAA, back contact 53 of relay DA, back contact 55 of relay AC, front contact 56 of relay AB, the junction of the right-hand winding of relay AA and the left-hand winding of relay AB, battery, ground. Similarly, the circuit for BA and BB is opened at front contact 58 of relay DB and a new holding circuit is made for relays BA and BB via: ground, contact 57 of relay TBA, back contact 58 of relay DB, back contact 59 of relay BC, front contact 60 of relay BB to the junction of the left-hand windings of relays BA and BB respectively, battery, ground.

Relay AA releases and front contacts 46 of relay AB connects the impulse repeating circuits to the third pair of hundreds digit windings 10 and 11 of the number indicator 1 which registers the third digit via: junction of windings 10 and 11, front contact 46 of relay AB, back contact 45 of relay AA, contact 44 of relay FA, contact 43 of relay PA. Similarly, relay BA releases and front contacts 51 of relay BB connects the impulse repeating circuits to the third pair of hundreds digit windings 10 and 11 of the number indicator 2 which registers the third digit via: junction of windings 19 and 20, front contact 51 of relay BB, back contact 50 of relay BA, contact 49 of relay FB, contact 48 of relay PB.

When DA reoperates, a circuit is completed for relays AB and AC in series via: ground, battery, winding of relay AC, right-hand winding of relay AB, contact 61 of relay AB, back contact 54 of relay AA, front contact 53 of relay DA, contact 52 of relay TAA, ground. Similarly, when relay DB reoperates, a circuit is completed for relays BB and BC in series via: ground, contact 57 of relay TBA, front contact 58 of relay DB, back contact 60 of relay BA, front contact 62 of relay BB, right-hand winding of relay BB, right-hand winding of relay BC, battery, ground.

Contact 74a of relay FA serves to shunt contacts 79 of relay TBA and likewise shunts contacts 81 of relay FB via contacts 80 of relay BS, relay FA operating under control of the code repeat relays ACA, ACB and ACC, respectively, over an obvious circuit.

At the end of the code, relay DA again releases so that relay AB releases, a holding circuit being completed for relay AC via: ground, contact 52 of relay TAA, back contact 53 of relay DA, front contact 55 of relay AC, winding of AC, battery, ground. Similarly, relay DB releases again at the end of the code so that relay BB releases, a holding circuit being completed for relay BC via: ground, contact 57 of relay TBA, back contact 58 of relay DB, front contact 59 of relay BC, right-hand winding of relay BC, battery, ground. Ground via a normally-closed manual key RKA, contact 63 of relay TAA, back contact 64 of relay AB, front contact 65 of relay AC, back contact 66 of relay ACC, back contact 67 of relay ACB, left-hand winding of relay ACA, battery, ground, results in the operation of relay ACA recording completion of the first code transmission from the calling box.

Relay FA operates via: ground, battery, winding of relay FA, contact 67a of relay ACA, ground. Similarly, relay FB operates via: ground, battery, winding of relay FB, back contact 68 of relay BB, contact 69 of relay BC to ground. Back contact 44 of relay FA disconnects the impulse repeating circuit from the number indicator 1, since the circuit previously traced above included contact 44 of relay FA. Similarly, back contact 49 of relay FB disconnects the impulse repeating circuit from the number indicator 2, since the circuit previously traced above included contact 49 of relay FB. In the meantime, front contact 70 of relay ACA, and front contact 70a of relay FA, complete alternative holding circuits for the windings of the indicators of number indicator 1, via: junction of windings 7, 9 and 11 of number indicator 1, contact 70 of relay ACA, resistance 71, ground, junction of windings 6, 8 and 10 of the number indicator 1, contact 70a of relay FA, resistance 36, battery, ground.

A similar alternative holding circuit for the windings of the indicators of number indicator 2 is made via: junction of windings 16, 18 and 20 of number indicator 2, contact 72 of relay FB, resistance 47a, battery, ground, the junction of windings 15, 17 and 19, contact 71b of relay BC, resistance 73, ground.

The number indicators 1 and 2 now record the number of the pulled alarm boxes, respectively. Contact 74 of relay FA operates a visual signal lamp CL and alarm bell 75 via: ground, battery, one junction of lamp CL and bell 75, a second junction of lamp CL and bell 75, contact 74 of relay FA, ground. Similarly, front contact 49a of relay FB may actuate bell 75 and lamp CL over an obvious circuit.

An alternative circuit for applying ground to the junction of the coils 7, 9 and 11 of the indicator 1, may be traced via: ground, resistance 71, contact 71a of relay ACB, when relay ACA is released and relay ACB is energized.

At the end of the inter-code break, relays LA, LAR and DA re-operate. The operation of contacts 53 of relay DA releases relay AB. Similarly at the end of the inter-code break, relays LB, LBR and DB re-operate. The operation of contact 58 of relay DB holds relay BC via: ground, battery, left-hand winding of relay BC, contact 76 of relay BC, back contact 62 of relay BB, back contact 60 of relay BA, front contact 58 of relay DB, contact 57 of relay TBA, ground. An alternative holding circuit for relay BC is also formed via: ground, manual key RKB, contact 77 of relay BC, back contact 78 of relay BB, contact 79 of relay TBA or contact 80 of relay BS, contact 81 of relay FB, back contact 58 of relay DB, break contact 58 of relay DB, contact 57 of relay TBA, ground, to hold relay BC during succeeding impulsing.

A parallel circuit is provided to energize relay TB via: ground, battery, winding of relay TB, contacts 79a of relay TBA, contacts 74b of relay FA, back contact 31 of relay LBR, ground.

The repeat codes from the pulled alarm box are now received but without effect on the indicators 1 and 2. The digits to be recorded by indicator 1 are counted by relays AA, AB and AC, but the digits to be recorded by indicator 2 are not counted by corresponding relays BA, BB and BC. At the end of the second code, ground via key RKA, contact 63 of relay TAA, contact 64 of relay AB, front contact 65 of relay AC, back contact 66 of relay ACC, front contact 67 of relay ACB, left-hand winding of relay ACB, battery, ground, holds relay ACB, but relay ACA is released due to the change-over of contacts 65 of relay AC. When relay AC is released at the beginning of the third code, ground via back contact 65 of relay AC, back contact 82 of relay ACA, front contact 83 of relay ACB, right-hand winding of relay ACB, left-hand winding of relay ACC, battery, ground, holds relay ACB and operates relay ACC.

Contacts 83a of relay ACB complete an alternative circuit for relay FA when relay ACA is deenergized via: ground, contact 83a, winding of relay FA, battery, ground.

When the pulled box finishes its cycle of operations relay LA reoperates followed by relays LAR, DA, contacts 53 of relay DA releasing relay AC. Relay ACC has an alternative holding circuit completed via: ground, battery, right-hand winding of relay ACC, contact 84 of relay ACC, back contact 83 of relay ACB, back contact 82 of relay ACA, back contact 85 of relay ACB, contact 86 of relay ACC to key RKA, ground. As relay BC is also locked via: ground, battery, right-hand winding of relay BC, front contact 59 of relay BC, contact 81 of relay FB, contact 80 of relay BS, back contact 78 of relay BB, contact 77 of relay BC, key RKB, ground, the indicators of indicator 1 and 2, which have been held in display position throughout reception of the repeat codes, remain held independently of contacts 52 of relay TAA and contact 57 of relay TBA, respectively, which previously controlled the holding circuits of AA, ACA, etc. and BA, etc.

When the identity of the pulled box has been established by the duty officer, he operates his release keys RKA, RKB, releasing relays AC, BC, ACC, which in turn release FA, FB. As relays LA, LAR, DA are now continuously operated, slow-release relays TA, TB, which operated to back contacts of relays LAR, LBR and held during impulsing are now released, and the holding circuits for the indicator coils of indicators 1 and 2 are opened, the indicators returning to normal as described in said British Patent No. 538,723.

A parallel energizing circuit for relay TAA may be traced via: ground, battery, winding of relay TAA, contacts 99*a* of relay TA (a slow release type), ground.

Relay TA is operated via: ground, battery, winding of relay TA, contacts 53*a* of relay DA, back contacts 29 of relay LAR, back contact 30 of relay ACC, ground.

If two boxes are pulled simultaneously, each box signals over one leg to the fire station, and relays LA and LB are impulsed independently according to the codes of the different boxes, which are indicated on the separate indicators 1 and 2.

If a second box is pulled while a first box is still code-sending, it puts full ground on its direct leg to the fire-station and holds the corresponding relay LA, or LB operated for sufficient time to release the relays TA, TAA or TB, TBA. Opening of the TAA or TBA contacts releases any operated relays AA, AB, AC, or BA, BB, BC and the corresponding indicator is in readiness to receive and indicate the code of the second box in exactly the manner previously described.

If a single box call is established, that is, code sending has ceased and the box has returned to normal, but the indicators are still held in display position, the new code will be received by indicator 2 only.

Relay BS operated when the first digit of the first code was received via: ground, battery, winding of relay BS, contact 87 of relay AA, contact 88 of relay BA, ground, and locked via: ground, battery, winding of relay BS, contact 89 of relay BS, contact 90 of relay TBA, ground. Contact 80, upon operation of relay BS, opened one leg of a holding circuit for relay BC which is locked after the first code is completely received, so that thereafter, BC is dependent on the holding circuit via: ground, key RKB, contact 77 of relay BC, contact 78 of relay BB, contact 79 of relay TBA, front contact 59 of relay BC, right-hand winding of relay BC, battery, ground.

If now a second call comes in from another box, signals over L1 will be without effect since relay ACC is locked via: ground, battery, right-hand winding of relay ACC, contact 84 of relay ACC, back contact 83 of relay ACB, back contact 82 of relay ACA, back contact 85 of relay ACB, contact 86 of relay ACC, key RKA, ground. It will be seen from the above circuit route that ACC is dependent solely upon its own made contacts and the key RKA. Relay ACC holds relay FA energized via: ground, contact 91 of relay ACC, winding of relay FA, battery, ground. Contact 44 of relay FA thereupon breaks thereby maintaining the impulsing circuit to number indicator 1 open, while relay FA applies battery to one side of number indicator 1 via: battery, resistance 36, contact 70*a* of relay FA, junction of windings 7, 9 and 11 of indicator 1. Relay ACA completes a circuit for the coils of indicator 1 via: ground, resistance 71, contact 92 of relay ACC, the junction of coils 6, 8 and 10 of indicator 1, thereby maintaining the digit indicators 3, 4 and 5 in their set position.

On the other leg of the line, the long pre-impulsing ground signal over L2 will operate relays LB and LBR sufficiently long to release relays TB and TBA so that relay BC is released at contact 79 of relay TBA, before slow release relay BS can release. Relay BC releases relay FB so that with contacts 39 of relay TBA and contacts 49 of relay FB open, indicator 2 homes. The circuit is now in readiness to set indicator 2 in response to impulses received over L2.

An alternative circuit for the energization of relay DL may be traced via: ground contacts 33*a* of relay RA, winding of relay DL, battery, ground. This circuit maintains DL energized when fast-acting relay LD through its contact 99 causes ground to be removed from the RA energization circuit when a code is sent over the L2 loop.

Relay BS cannot re-operate as its circuit is dependent on both relays AA and BA operating, but AA is prevented from operating by disconnecting the operating earth for relays DA and TA via contact 29 of relay LAR and break contact 30 of relay ACC. The make contact 93 of relay ACB maintains an operating ground for relays DA and TA despite the removal thereof by relay ACC, until a complete code is received.

In consequence, when the code is completely received, relay BC locks via: ground, battery, right-hand winding of relay BC, front contact 59 of relay BC, contact 81 of relay FB, back contact 80 of relay BS, back contact 78 of relay BB, front contact 77 of relay BC, key RKB, ground. It will be observed that relay BC holds independently of relay TBA so that the indicator 2 is now held until the duty officer depresses key RKB to release indicator 2, and key RKA to release indicator 1.

Single box calls may be received despite faults on the loop.

*Grounded line*

A grounded line condition causes either relays LA or LB to remain operated, the free relay only responding to the calling impulses. The code of the calling box is set up on the associated section of the indicator which then locks under control of the release key.

*Shunted box*

When a shunted box is pulled, relay LA remains held to the loop while relay LB responds to the earth impulses, causing the code to appear on the number indicator 2 which again locks under control of the release key RKB.

*Disconnected line*

A box pulled in the broken line condition causes either relay LA or LB to respond depending on which side of the break the box is situated. The associated section of the indicator registers the code of the box pulled and remains held under control of the applicable release key RKA or RKB.

*Alarm indications*

A fire call is indicated by the lighting of lamp CL and the sounding of an alarm bell 75 via: ground, front contact 99*b* of relay FB, lamp CL and bell 75 in parallel, battery, ground. An additional circuit for the lighting of lamp CL and the sounding of bell 75 is completed over contact 74 of relay FA.

A ground appearing on the loop causes relays LB and LBR to operate and causes relay EL to operate via: ground, battery winding of relay EL, contact 94 of relay LBR, ground. A parallel alternative circuit is provided for relay EL via: ground, battery, winding of relay EL, contact 95 of relay DL, contact 97*a* of relay LAR, ground, to cover the contingency of a ground appearing on a broken line. Relay EL controls the lighting of lamp ETL via: ground, battery, lamp ETL, contact 97 of relay EL, contact 98 of relay FA, back contact 99b of relay FB, ground.

A broken line releases relays LA and LD, causing relay DL to operate via: ground, battery, winding of relay DL, back contact 99 of relay LD, ground. Thereupon, alarm lamp DLL is lighted via: ground, battery, lamp DLL, contact 100 of relay DL, contact 98 of relay FA, back contact 99b of relay FB, ground.

When an alarm box is short-circuited, line relay LA will not respond to impulses from the box, since it is held operated by the short circuit loop. The counting train of relays AA, AB and AC does not operate and a circuit is completed for relay SC via: ground, battery, winding of relay SC, contacts 101 of relay EL, contacts 102 of relay DL, contacts 103 of relay BC (operated at the end of the first code transmission), contacts 104 of relay ACA, (unoperated because the code has not operated relay LA), back-contact 105 of relay FB, ground. False operation of relay SC is prevented by the contacts 101 of relay EL and contacts 102 of relay DL. Relay SC controls the lighting of lamp SCL which visually indicates a short-circuit via: ground, battery, lamp SCL, contacts 106 of relay SC, ground. Lamp SCL remains alight together with the fire call indication lamp CL.

Relay SC locks via: ground, battery, winding of relay SC, contacts 107 of relay SC, contact 108 of relay FA (indicator 1 not having been operated), key RKS, ground. Relay SC is released and lamp SCL extinguished upon manual opening of key RKS by the duty officer.

It will be understood that although only one alarm bell, viz. 75 has been shown, similar audible alarms may be connected in parallel to each of the visual alarm indicators SCL, ETL and DLL.

What is claimed is:

1. A closed loop electric signalling system interconnecting a main station with a plurality of sub-stations, each adapted to send different identifying coded signals over said loop to said main station, comprising at said main station a first and second indicator means, each adapted to display any of said identifying coded signals, a first actuating means responsive to any single coded signal transmitted over said loop from any of said sub-stations, said first actuating means coupled between said loop and said first indicator means, a second actuating means responsive to any other single coded signal transmitted over said loop simultaneously with said first mentioned single coded signal, control means comprising a first and a second impulse repeating means respectively coupled between said first and said second actuating means and said first and said second indicator means to actuate each of said indicator means in accordance with the identifying coded signals responded to by said respective actuating means, whereby said first and said second indicator means are adapted to display the same code when a first coded signal is placed on said loop and to display different codes when a second coded signal is simultaneously placed on said loop with said first coded signal.

2. A closed loop electric signalling system as claimed in claim 1 further comprising a first and second sequence means respectively coupled between said first and second impulse repeating means and said first and second indicator means, said sequence means responsive to internal grouping of the respective identifying codes transmitted over said loop and adapted to release said second indicator means from control of said first actuating means upon receipt of a second coded signal and to place said second actuating means under control of said second coded signal, whereby said second indicating means is shifted to the control of said second actuating means.

FREDERICK HARRY BRAY.
ERNEST FREDERICK BATES.
JOHN CONNELL DOUGHTY.

REFERENCES CITED

The following references are of record in the file of this patent:

UNITED STATES PATENTS

| Number | Name | Date |
|---|---|---|
| 454,924 | Wood | June 30, 1891 |
| 683,759 | Herzog et al. | Oct. 1, 1901 |
| 2,114,324 | Weld | Apr. 19, 1938 |
| 2,215,436 | Preston | Sept. 17, 1940 |
| 2,287,816 | Muehter | June 30, 1942 |
| 2,367,258 | Bates | Jan. 16, 1945 |
| 2,373,134 | Massonneau | Apr. 10, 1945 |

FOREIGN PATENTS

| Number | Country | Date |
|---|---|---|
| 300,927 | Great Britain | Nov. 19, 1928 |